United States Patent
Kawashima

[11] Patent Number: 5,882,706
[45] Date of Patent: Mar. 16, 1999

[54] FOOD AND DRINK AND ADDITIVE THEREFOR

[76] Inventor: Toshio Kawashima, 26-18, Mori 2-chome, Tanabe, Wakayama, Japan

[21] Appl. No.: 919,940

[22] Filed: Aug. 28, 1997

[51] Int. Cl.[6] ..................................................... A23L 1/304
[52] U.S. Cl. ............................. 426/74; 426/66; 426/271; 426/590; 426/615; 426/638; 426/650; 426/654
[58] Field of Search ................................. 426/74, 66, 271, 426/590, 615, 638, 650, 654

[56] References Cited

U.S. PATENT DOCUMENTS

| | | | |
|---|---|---|---|
| 3,958,017 | 5/1976 | Morse et al. | 426/74 |
| 5,096,721 | 3/1992 | Levy | 426/66 |

FOREIGN PATENT DOCUMENTS

| | | | |
|---|---|---|---|
| 54-113476 | 9/1979 | Japan . | |
| 55-118366 | 9/1980 | Japan . | |
| 2461463 | 3/1981 | Japan | 426/66 |
| 3129963 | 6/1988 | Japan | 426/74 |
| 3016280 | 7/1990 | Japan . | |
| 2-257846 | 10/1990 | Japan . | |
| 403139263 | 6/1991 | Japan | 426/74 |
| 5-245481 | 9/1993 | Japan . | |
| 8-23891 | 1/1996 | Japan . | |

*Primary Examiner*—Helen Pratt
*Attorney, Agent, or Firm*—Jeffer, Mangels, Butler & Marmaro LLP

[57] ABSTRACT

A food and drink containing a composite ferrosoferric compound and Japanese apricot vinegar is disclosed.

11 Claims, No Drawings

FOOD AND DRINK AND ADDITIVE THEREFOR

This application is a continuation of PCT/JP95/02745 filed Dec. 28, 1995.

BACKGROUND OF INVENTION

1. Technical Field

The present invention relates to a food and a drink having biological and physiological efficacies which can be obtained at a low cost, by a facile preparation and in a short time, and, an additive therefor which can manufacture foods and drinks having biological and physiological efficacies at a low cost, by a facile preparation and in a short time.

2. Background Art

Water which is obtained through treatment with composite ferrosoferric salt (hereinafter simply referred to as "ferrosoferric water") is commonly known as having biological and physiological efficacies. Such ferrosoferric water can be obtained by dissolving a very small amount (for example, about $10^{-12}$ g/ml) of composite ferrosoferric compound.

The composite ferrosoferric compound may typically be composite ferrosoferric salt as complex salt, namely the composite salt composed of inorganic salt and organic acid salt. The ferrosoferric water may also be obtained by passing water through a filter which structurally contains the composite ferrosoferric compound, or by soaking any ore, mineral or ceramics containing the composite ferrosoferric compound into water.

In order to prepare the ferrosoferric water for household use, there is the preparation powder available on the market to be solved in water of waterworks, or special water-purifying devices attached to a faucet. The household ferrosoferric water may also be obtained in each family by soaking a special ore, mineral or ceramics into water in a container, or by purchasing a bottle of ferrosoferric water manufactured by solving the composite ferrosoferric salt in factory. The obtained ferrosoferric water may be served for straight drinking, or as material for cooking, or may further be used as water for washing the face or for taking a bath. Accordingly, the ferrosoferric water has been known as having biologically and physiologically good effects to the human body.

As an example of the efficacies of the ferrosoferric water, it can be mentioned that there is a function to inhibit reaction with negative ions. The water of waterworks commonly contains free chlorine for chlorination (disinfection), which smells chlorine and therefore is not preferable from the biological and physiological viewpoint. However, when the water is converted to the ferrosoferric water, the reaction thereof with chloride ions is inhibited, which results in a undetected state of chlorine. In addition, the ferrosoferric water inhibits proliferation of microbes, or arranges the molecular structure of water into minute clusters, thus is confirmed to have efficacies, like an easy absorption of water into the human body, or a making of water to be good taste.

As above described, the ferrosoferric water is recognized to have efficacies, but the available place and time thereof are limited. Although a user prepares or purchases the ferrosoferric water, if the user wishes to use the ferrosoferric water in any place other than home, for example if the user goes out to any place and wishes to drink the ferrosoferric water there, the user should carry the ferrosoferric water with him or her. When the ferrosoferric water is prepared by ore, mineral or ceramics, it usually takes thirty minutes or even up to eight hours to prepare such water.

There are water-purifying devices attached to a faucet which can prepare the ferrosoferric water in a short time, but it is troublesome to attach the water-purifying device to the faucet, and further, the user is then frequently required to change the filter of the water-purifying device. In addition, there is a disadvantageous point that such a water-purifying device or the filter thereof is very expensive.

DISCLOSURE OF INVENTION

It is an object of the present invention to provide food and drink having efficacies of the ferrosoferric water, which can be obtained at a low cost, by a facile preparation and in a short time.

To achieve the object mentioned above, according to the present invention, there is provided food and drink containing either a composite ferrosoferric compound and Japanese apricot vinegar, or the water treated with a composite ferrosoferric compound and Japanese apricot vinegar. Further, there is provided an additive for food and drink containing either a composite ferrosoferric compound and Japanese apricot vinegar, or the water treated with a composite ferrosoferric compound and Japanese apricot vinegar.

With this arrangement, the food and drink according to the present invention can be prepared readily in a short time at a low cost. The use of the additive serves to provide food and drink having the efficacy of the ferrosoferric water compound readily in a short time at a low cost.

BEST MODE FOR CARRYING OUT THE INVENTION

The detail of embodiments of the present invention will now be described. With regard to the embodiments as described below, ferrosoferric water used for these embodiments was obtained by treatment of water of waterworks with a preparing device comprising magnetized iron ore, limestone and special ceramics. The water was contained in a container with the preparing device, and was sufficiently treated with the composite ferrosoferric compound for a long time.

Japanese apricot vinegar was prepared by common method, of which analysis result is shown in the following table 1.

TABLE 1

Analysis of ingredients of Japanese apricot vinegar

| Experimental Items | Results |
| --- | --- |
| Water | 76.8 g/100 g |
| Sugar | 0.9 g/100 g |
| Salt | 18.2 g/100 g |
| Vitamin C | 0 mg/100 g |
| Organic Acid Composition | 3306 mg/100 g of citric acid |
|  | 629 mg/100 g of malic acid |
|  | 6 mg/100 g of succinic acid |
|  | 1 mg/100 g of formic acid |
|  | 79 mg/100 g of acetic acid |
|  | 6 mg/100 g of pyroglutamic acid |
| pH | 1.9 |
| Viable cell count | Not more than 300/g(0) |
| Amino Acid Composition (Free) | 0.9 mg/100 g of isoleucine |
|  | 0.8 mg/100 g of leucine |
|  | 0.6 mg/100 g of lysine |
|  | 0.1 mg/100 g of methionine |
|  | 0.4 mg/100 g of cystine |
|  | 0.6 mg/100 g of phenylalanine |
|  | 0.6 mg/100 g of tyrosine |
|  | 1.4 mg/100 g of threonine |

TABLE 1-continued

Analysis of ingredients of Japanese apricot vinegar

| Experimental Items | Results |
|---|---|
| | 1.5 mg/100 g of valine |
| | 0.3 mg/100 g of histidine |
| | 0.4 mg/100 g of arginine |
| | 8.1 mg/100 g of alanine |
| | 24.1 mg/100 g of aspartic acid |
| | 1.9 mg/100 g of glutamic acid |
| | 0.6 mg/100 g of glycine |
| | 2.2 mg/100 g of proline |
| | 3.4 mg/100 g of serine |

As shown in Table 1, Japanese apricot vinegar contains abundant organic acids such as citric acid or acetic acid, or amino acids, which have good effects to the human body. The Japanese apricot vinegar has been used for cooking, or drunk for maintaining the health condition, from ancient times, and is recognized to have the effects of bleaching, deodorization, antiphlogistic, and the function of disinfection. Therefore the Japanese apricot vinegar has been used for various purposes. The inventor of the present invention found that the Japanese apricot vinegar enhances the biological and physiological efficacies of the composite ferrosoferric compound, thus the present invention has been made.

(EMBODIMENT 1)

The ferrosoferric water and the Japanese apricot vinegar were added to 80g of common water of waterworks, and after stirring the mixture, the density of containing chlorine was measured. In this measurement, the capability of inhibiting of ion reactions, namely one of the typical efficacies of the composite ferrosoferric compound, was inspected. The measurements of containing chlorine in respect to each comparative example and each embodiment as shown below had been made by directly taking in water of waterworks from faucet, and by adding 0-tolidine solution (0.11% of chlorate) as a reagent after arrangements of additives as shown below in Table 2. In respect to each sample, the additives were added to the water when one minute had passed after the water was taken in, and the reagent was then added after further one minute had passed, and the judgement was eventually made after further two minutes had passed.

TABLE 2

Effects to water of waterworks (1)

| | Additives to 80 g of water of waterworks | Cl. density*(ppm) |
|---|---|---|
| Comparative Ex. 1-1 | None | 3.0 |
| Comparative Ex. 1-2 | 3.0 g of Fe.water(*1) | 3.0 |
| Comparative Ex. 1-3 | 0.01 g of Ap.(*2) + 0.09 g of W.water(*3) | 1.0 |
| Comparative Ex. 1-4 | 0.03 g of Ap. + 0.27 g of W.water | 0.5 |
| Comparative Ex. 1-5 | 0.05 g of Ap. + 0.45 g of W.water | 0.2 |
| Embodiment 1-1 | 0.01 g of Ap. + 3.0 g of Fe.water | 1.0 |
| Embodiment 1-2 | 0.03 g of Ap/ + 3.0 g of Fe.water | 0.2 |

TABLE 2-continued

Effects to water of waterworks (1)

| | Additives to 80 g of water of waterworks | Cl. density*(ppm) |
|---|---|---|
| Embodiment 1-3 | 0.05 g of Ap. + 3.0 g of Fe.water | 0.0 |

*Chlorine density (the same is referred to hereinafter)
*1 Fe. water: ferrosoferric water
*2 Ap.: Japanese apricot vinegar
*3 W.water: water of waterworks As seen from the above Table 2, the equivalent densities of chlorine were measured in the comparative examples 1—1 and 1–2, and it became clear that when the ferrosoferric water was solely added to water, there was no effective change in condition of water. When the Japanese apricot vinegar was solely added to water, namely in the cases of comparative examples 1–3 through 1–5, there were several effective changes in the condition of water. When both the ferrosoferric water and the Japanese apricot vinegar were added, namely in the cases of embodiments 1–2 and 1–3, the synergistic effect was obtained. As shown in the above embodiments, when Japanese apricot vinegar was added much more, the corresponding higher capability of inhibiting of ion reaction was obtained.

(EMBODIMENT 2)

0.1–1.8g of the ferrosoferric water containing 10% (weight ratio; the same is referred to hereinafter) of the Japanese apricot vinegar was added to 80 g of common water of waterworks, and after stirring the mixture, the density of containing chlorine was measured by the same method as that of the embodiment 1. In respect to each sample, the additives were added to the water when one minute had passed after the water was taken in, and the reagent was then added after further one minute had passed, and the judgement was eventually made after further two minutes had passed.

TABLE 3

Effects to water of waterworks (2)

| | Ferrosoferric water containing 10% of Japanese apricot vinegar (g) | Cl. density (ppm) |
|---|---|---|
| Comparative Ex. 2-1 | None | 3.0 |
| Embodiment 2-1 | 0.1 | 1.0 |
| Embodiment 2-2 | 0.2 | 0.8 |
| Embodiment 2-3 | 0.3 | 0.5 |
| Embodiment 2-4 | 0.4 | 0.4 |
| Embodiment 2-5 | 0.5 | 0.3 |
| Embodiment 2-6 | 0.6 | 0.2 |
| Embodiment 2-7 | 0.7 | 0.2 |
| Embodiment 2-8 | 0.8 | 0.1 |
| Embodiment 2-9 | 0.9 | 0.1 |
| Embodiment 2-10 | 1.0 | 0.1 |
| Embodiment 2-11 | 1.1 | 0.1 |
| Embodiment 2-12 | 1.2 | 0.0 |
| Embodiment 2-13 | 1.3 | 0.0 |
| Embodiment 2-14 | 1.4 | 0.0 |
| Embodiment 2-15 | 1.5 | 0.0 |
| Embodiment 2-16 | 1.6 | 0.0 |
| Embodiment 2-17 | 1.7 | 0.0 |
| Embodiment 2-18 | 1.8 | 0.0 |

For reference, the density of chlorine to be felt as tasty is not more than 0.1ppm. Consequently, under this condition, it is clear from the embodiment 2–8 of the above table 3 that it is preferable to add not less than 0.8 g of the ferrosoferric water which contains 10% of the Japanese apricot vinegar (namely, not less than 0.08 g of Japanese apricot vinegar and not less than 0.72 g of the ferrosoferric water) to water of waterworks. It is needless to say that, after the ferrosoferric water containing the Japanese apricot vinegar is added to the water of waterworks, if the water of waterworks is left for a long time, the lower density of chlorine shall be measured.

(EMBODIMENT 3)

0.5–2.2 g of the ferrosoferric water containing 10% of the Japanese apricot vinegar was added to 80 g of common water of waterworks, and after stirring the mixture, the obtained mixture drink was drunk by twenty persons of panel for the purpose of sensory test with regard to smell and taste of chlorine (kalk; breaching powder) as compared with the water of waterworks, which has characteristic smell and taste of chlorine. In respect to each sample, the additives were added to the water and stirred when one minute had passed after the water was taken in, and the sensory test was made after further three minutes had passed.

TABLE 4

Effects to water of waterworks (3)

| | F.water/Ap. 10% (*1) | Smell & taste of Cl./W.water (*2) | | |
|---|---|---|---|---|
| | | more sensitive | almost the same | less sensitive |
| Embodiment 4-1 | 0.5 | 5 | 10 | 5 |
| Embodiment 4-2 | 0.9 | 2 | 7 | 11 |
| Embodiment 4-3 | 1.1 | 4 | 2 | 14 |
| Embodiment 4-4 | 1.3 | 4 | 0 | 16 |
| Embodiment 4-5 | 1.5 | 3 | 3 | 14 |
| Embodiment 4-6 | 1.8 | 5 | 0 | 15 |
| Embodiment 4-7 | 2.2 | 2 | 3 | 15 |

*1 Amount of ferrosoferric water containing 10% of Japanese apricot vinegar
*2 Smell and taste of chlorine as compared with water of waterworks As seen from the results of the present embodiment, when not less than 0.9 g of the ferrosoferric water containing 10% of Japanese apricot vinegar is added to the water of waterworks, it is possible to reduce the smell and taste of chlorine to the extent of being sensory felt, which substantially coincides with the result of the embodiment 2. However, when 1.8 g of the ferrosoferric water with 10% of the Japanese apricot vinegar was added, there were opinions of panel that the water was "not very tasty", "considerably salty", "bad taste", or "tart". Further in the case of 2.2 g of the ferrosoferric water with the Japanese apricot vinegar, there were many opinions that the water was "strange taste", "peculiar taste", "bad taste" or "tart". Consequently, when not less than 1.8 g of the ferrosoferric water containing 10% of the Japanese apricot vinegar is added to the water of waterworks, it is understood that the taste of Japanese apricot vinegar becomes too strong to be drunk as drinking water. In addition, unless the density of chlorine of the water according to the embodiment becomes not more than 0.1 ppm, it is impossible to find any clear difference as compared with the comparative examples. Therefore the most remarkable effect of the embodiment as drinking water can be obtained when the amount of the ferrosoferric water containing 10% of Japanese apricot vinegar is in the range between 0.9 g and 1.5 g. It is needless to say that, after the ferrosoferric water containing the Japanese apricot vinegar is added to the water of waterworks, if the water of waterworks is left for a long time, the lower density of chlorine shall be measured.

(EMBODIMENT 4)

1.5 g of the ferrosoferric water containing 10% of the Japanese apricot vinegar was added to 80 g of common water of waterworks, in which powder for preparing a drink (of which trademark is "Gatorade" manufactured in Japan by Yukijirushi Nyugyo Kabushiki Kaisha) was solved. After stirring the mixture, a tasting of the obtained mixture drink was made by twenty persons of panel. As a result, nineteen persons out of twenty answered that the one to which the ferrosoferric water with the Japanese apricot vinegar was added tasted better as being mellow and smooth.

(EMBODIMENT 5)

1.5 g of the ferrosoferric water containing 10% of the Japanese apricot vinegar was added to 80 g of vegetable juice available on the market (of which trademark is "Jujitsu Yasai" manufactured in Japan by Kabushiki Kaisha Ito-en). After stirring the mixture, a tasting of the obtained mixture drink was made by twenty persons of panel. As a result, fourteen persons out of twenty answered that the one to which the ferrosoferric water with the Japanese apricot vinegar was added tasted better as being mellow and smooth.

(EMBODIMENT 6)

80 g of Japanese apricot without seed (stone) was prepared by common method with addition of seasonings thereto, and to which 160 g of the ferrosoferric water containing 90 weight percent of the composite ferrosoferric compound and 10% of the Japanese apricot vinegar was added, and the mixture was blended by blender in order to obtain the Japanese apricot paste. On the other hand, 80 g of Japanese apricot paste was also prepared by common method with addition of seasonings thereto, and to which 160 g common water of waterworks was added, and the mixture was also blended by blender in order to obtain an ordinary type of Japanese apricot paste. After that, a tasting of the obtained two types of pastes was made by twenty persons of panel. As a result, sixteen persons out of twenty answered that the ordinary type of Japanese apricot paste less tasted mellow and more tasted tart.

(EMBODIMENT 7)

A mixture was prepared which consisted of, 50% of the ferrosoferric water in which 90 weight percent of the composite ferrosoferric compound and 10% of the Japanese apricot vinegar was contained, 25% of Japanese apricot without seed prepared by common method, and 25% of tomato ketchup available on the market. The mixture was stirred for 30 minutes at 85° C. in order to obtain a seasoning with the taste of Japanese apricot. The quantity of the obtained seasoning was increased by 100 by dilution and left for 1–10 minutes. After that, the dilution of seasoning was used for washing of food materials such as fishes or vegetables, or for soaking other food materials for stew or fry therein for a short time. The thus prepared food materials were then left for 20–30 minutes without draining. When these food materials were cooked and a tasting thereof was made, the better taste was obtained as compared with those for which the dilution of seasoning was not used. In addition, during cooking of any food material, when a small quantity of the above dilution of seasoning was added to soup, stew, curry, fry, or added to water to cook rice, or boil noodle (Japanese "udon" or "soba") or pasta, the same effect of better taste as above discussed was confirmed. When a small quantity of the dilution of seasoning was added to the completed food, the same effect of better taste as above discussed was also confirmed.

The seasoning can also be used without dilution thereof. When the seasoning without dilution was directly used for drinks such as coffee, tea, alcoholic beverage, or for foods such as salad, soup, meat or fish, the better taste was obtained, and the same effects as those described in the embodiments 1–5 were confirmed. When the quantity of the seasoning was increased by 1,000 by dilution, the same effect as that of being increased by 100 by dilution was obtained.

In the present embodiment 7, tomato ketchup was used for the seasoning, but it is clear that the present embodiment is not limited to tomato ketchup. Any one or more fluid or liquid seasoning, such as soy sauce, vinegar, salad oil, sesame oil, sauce (typically "Worcester sauce") or mayonnaise, can be solely or combinably used for the seasoning. It is also clear that the ratio of addition of mixture of the ferrosoferric water containing the Japanese apricot vinegar to the seasoning varies subject to the type of seasoning. It is also possible to add further powder or liquid type of seasonings or spices, such as salt, sugar, pepper or mustard to the above discussed seasoning in order to arrange the taste.

The present invention is not limited to the embodiments 1–7 as described above, and variations may be made without departing from the spirit and scope of the invention. For example, although the ferrosoferric water containing 10 weight percent of the Japanese apricot vinegar is chiefly used in the embodiments of the present invention, it is clear that the amount of weight percent is not limited to that. As long as the ferrosoferric water containing 10% of the Japanese apricot vinegar is used for common drinking water, etc., it is sufficient to prepare about 1 g of such ferrosoferric water. Therefore it is possible to for a user to go out, carrying such ferrosoferric water in a container with a syringe or in a container with a spray nozzle, so that the addition of the ferrosoferric water to foods just before eating them can easily be made.

I claim:

1. Food and drink containing a composite ferrosoferric compound and Japanese apricot vinegar.

2. Food and drink as claimed in claim 1, further containing Japanese apricot without seed thereof.

3. Food and drink containing water treated with a composite ferrosoferric compound and Japanese apricot vinegar.

4. Food and drink as claimed in claim 3, wherein said food and drink are Japanese apricot paste, and wherein said Japanese apricot paste comprises a mixture of water treated with 90 weight percent of composite ferrosoferric compound and 10 weight percent of Japanese apricot vinegar in a ratio of 2 blended together with Japanese apricot without seed in a ratio of 1.

5. Food and drink as claimed in claim 3, further containing Japanese apricot without seed thereof.

6. An additive for food and drink containing a composite ferrosoferric compound and Japanese apricot vinegar.

7. An additive for food and drink as claimed in claim 6 further containing Japanese apricot without seed thereof.

8. An additive for food and drink containing water treated with a composite ferrosoferric compound and Japanese apricot vinegar.

9. An additive for food and drink as claimed in claim 8, in which a mixture of water treated with 90 weight percent of composite ferrosoferric compound and 10 weight percent of Japanese apricot vinegar is prepared wherein and 50 weight percent of said mixture and, 25 weight percent of Japanese apricot without seed, and 25 weight percent of seasoning are stirred together for 30 minutes at 85° C.

10. An additive for food and drink as claimed in claim 9, wherein said seasoning is tomato ketchup.

11. An additive for food and drink as claimed in claim 8, further containing Japanese apricots without seed thereof.

* * * * *